United States Patent
Watanabe et al.

(10) Patent No.: US 9,862,804 B2
(45) Date of Patent: Jan. 9, 2018

(54) POLYARYLENE SULFIDE RESIN POWDER/GRAIN COMPOSITION AND METHOD OF PRODUCING SAME

(71) Applicant: Toray Industries, Inc., Tokyo (JP)

(72) Inventors: Kei Watanabe, Tokai (JP); Kazusada Takeda, Tokai (JP); Hiroshi Takezaki, Nagoya (JP); Kei Makita, Nagoya (JP); Yosuke Nishimura, Tokai (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/120,816

(22) PCT Filed: Feb. 13, 2015

(86) PCT No.: PCT/JP2015/053971
§ 371 (c)(1),
(2) Date: Aug. 23, 2016

(87) PCT Pub. No.: WO2015/129487
PCT Pub. Date: Sep. 3, 2015

(65) Prior Publication Data
US 2016/0362524 A1    Dec. 15, 2016

(30) Foreign Application Priority Data
Feb. 25, 2014    (JP) ................. 2014-034174

(51) Int. Cl.
*C08J 3/12*    (2006.01)
*C08K 3/36*    (2006.01)
*C09D 181/04*    (2006.01)

(52) U.S. Cl.
CPC    *C08J 3/12* (2013.01); *C08K 3/36* (2013.01); *C09D 181/04* (2013.01); *C08J 2381/04* (2013.01); *C08K 2201/011* (2013.01)

(58) Field of Classification Search
CPC ........................................................ C08J 3/12
See application file for complete search history.

(56) References Cited

U.S. PATENT DOCUMENTS

| | | | |
|---|---|---|---|
| 3,322,834 A | 5/1967 | Hill et al. | |
| 3,354,129 A | 11/1967 | Edmonds et al. | |
| 3,919,177 A | 11/1975 | Campbell | |
| 4,918,134 A | 4/1990 | Kato et al. | |
| 5,272,185 A * | 12/1993 | Matsumura | C09D 5/033 523/212 |

FOREIGN PATENT DOCUMENTS

| | | |
|---|---|---|
| JP | 45-3368 B | 2/1970 |
| JP | 52-12240 B | 4/1977 |
| JP | 61-7332 A | 1/1986 |
| JP | 63-135451 A | 6/1988 |
| JP | 1-254765 A | 10/1989 |
| JP | 05295301 A * | 11/1993 |
| JP | 10-273594 A | 10/1998 |
| JP | 2934082 | 8/1999 |
| JP | 2002-332351 A | 11/2002 |
| JP | 2007-154166 A | 6/2007 |
| JP | 2009-173878 A | 8/2009 |
| JP | 2010-65089 A | 3/2010 |
| JP | 2013-166667 A | 8/2013 |
| KR | 10-2012-0100691 | 9/2012 |

OTHER PUBLICATIONS

"Terminology Dictionary of Powder Technology," Second Edition, pp. 56-57, along with a partial English translation.

* cited by examiner

*Primary Examiner* — Michael Pepitone
(74) *Attorney, Agent, or Firm* — DLA Piper LLP (US)

(57) ABSTRACT

A polyarylene sulfide resin powder/grain composition in which 100 weight parts of polyarylene sulfide resin powder/grain material whose average particle diameter exceeds 1 μm and is less than or equal to 100 μm and whose uniformity degree is less than or equal to 4 has been blended with 0.1 to 5 weight parts of an inorganic fine particle having an average particle diameter greater than or equal to 20 nm and less than or equal to 500 nm.

8 Claims, No Drawings

POLYARYLENE SULFIDE RESIN POWDER/GRAIN COMPOSITION AND METHOD OF PRODUCING SAME

CROSS REFERENCE TO RELATED APPLICATIONS

This application is a §371 of PCT/JP2015/053971 with an International filing date of Feb. 13, 2015, which is based on Japanese Patent Application No. 2014-034174, filed Feb. 25, 2014.

TECHNICAL FIELD

This disclosure relates to a polyarylene sulfide resin powder/grain composition small in average particle diameter, excellent in powder fluidity, and low in compression degree.

BACKGROUND

Polyarylene sulfide (hereinafter, sometimes abbreviated as PAS) represented by polyphenylene sulfide (hereinafter, sometimes abbreviated as PPS) has suitable characteristics as an engineering plastic such as excellent heat resistance, barrier property, chemical resistance, electrical insulation property and moist heat resistance, and is used mainly in injection forming and extrusion forming of various electrical and electronic component parts, machine component parts and motor vehicle component parts, films, fibers and the like.

The use and deployment of powder/grain materials of such excellent PAS resin for various forming processes and as a coating agent and a heat resistant additive is highly demanded. As for the method of producing a PAS resin powder/grain material, various methods as indicated below have been proposed.

In Japanese Unexamined Patent Publication (Kokai) No. HEI 10-273594, PPS as islands and another thermoplastic polymer as sea are melted and kneaded to form a resin composition having a sea-island structure, and then the sea phase is subjected to dissolution and washing to obtain a PPS resin powder/grain material. Furthermore, in Japanese Unexamined Patent Publication (Kokai) No. 2007-154166, PPS is dissolved in a solvent at high temperature and then cooled for precipitation, whereby a PPS resin powder/grain material is obtained.

Furthermore, as a method of improving the fluidity of a resin powder/grain material, there is a method as described in Japanese Unexamined Patent Publication (Kokai) No. 2013-166667 in which an inorganic fine particle is added to increase the interparticle distance and therefore reduce the interaction between particles.

However, in the method described in Japanese Unexamined Patent Publication (Kokai) No. 2013-166667, it is difficult to resolve the deterioration in fluidity caused by compression in a lower portion of a silo or a hopper.

The PAS resin powder/grain material, because of its high electrical insulation property, is apt to undergo aggregation due to static electricity and is therefore not excellent in fluidity, and therefore gives rise to a problem that during a production process, trouble at the time of supply or discharge to or from the silo or the like may often occur. Furthermore, the PAS resin powder/grain material is high in compression degree so that in a lower portion of the silo or the hopper, the PAS resin powder/grain material is compressed because of the powder pressure and increases in bulk density, causing a further decrease in fluidity.

In particular, the PPS resin powder/grain materials obtained by the methods of Japanese Unexamined Patent Publication (Kokai) No. HEI 10-273594 and Japanese Unexamined Patent Publication (Kokai) No. 2007-154166 are small in particle diameter and, therefore, the area of contact with neighboring particles becomes large so that electrostatic aggregation of particles is likely to occur and therefore fluidity is poor.

It could therefore be helpful to efficiently obtain a polyarylene sulfide resin powder/grain material small in average particle diameter, excellent in powder fluidity and low in compression degree.

SUMMARY

We thus provide:

(1) A polyarylene sulfide resin powder/grain composition in which 100 weight parts of a polyarylene sulfide resin powder/grain material whose average particle diameter exceeds 1 µm and is less than or equal to 100 µm and whose uniformity degree is less than or equal to 4 has been blended with 0.1 to 5 weight parts of an inorganic fine particle having an average particle diameter greater than or equal to 20 nm and less than or equal to 500 nm.

(2) The polyarylene sulfide resin powder/grain composition according to (1), characterized in that the inorganic fine particle is a spherical silica fine particle.

(3) The polyarylene sulfide resin powder/grain composition according to (1) or (2), wherein the average particle diameter of the polyarylene sulfide resin powder/grain material is greater than or equal to 10 and less than or equal to 50 µm.

(4) A production method for the polyarylene sulfide resin powder/grain composition according to any one of (1) to (3), characterized by blending an inorganic fine particle in a polyarylene sulfide resin powder/grain material which is obtainable by grinding a polyarylene sulfide resin particle whose average particle diameter is greater than or equal to 40 µm and less than or equal to 2 mm and whose average particle diameter exceeds 1 µm and is less than or equal to 100 µm and whose uniformity degree is less than or equal to 4.

(5) The production method for the polyarylene sulfide resin powder/grain composition according to (4), characterized in that the grinding is dry grinding.

A polyarylene sulfide resin powder/grain composition small in average particle diameter, excellent in powder fluidity, and low in compression degree can be efficiency obtained.

DETAILED DESCRIPTION

PAS Resin

The PAS is a homopolymer or a copolymer that has a repeating unit whose formula is —(Ar—S)— as a main constitutional unit and preferably that contains the repeating unit in an amount of 80 mol % or more. Ar is a group that contains an aromatic ring in which a bonding arm exists. As examples of Ar, bivalent repeating units represented by formula (A) to formula (L) below and the like are indicated. Among these, a repeating unit represented by formula (A) is particularly preferable.

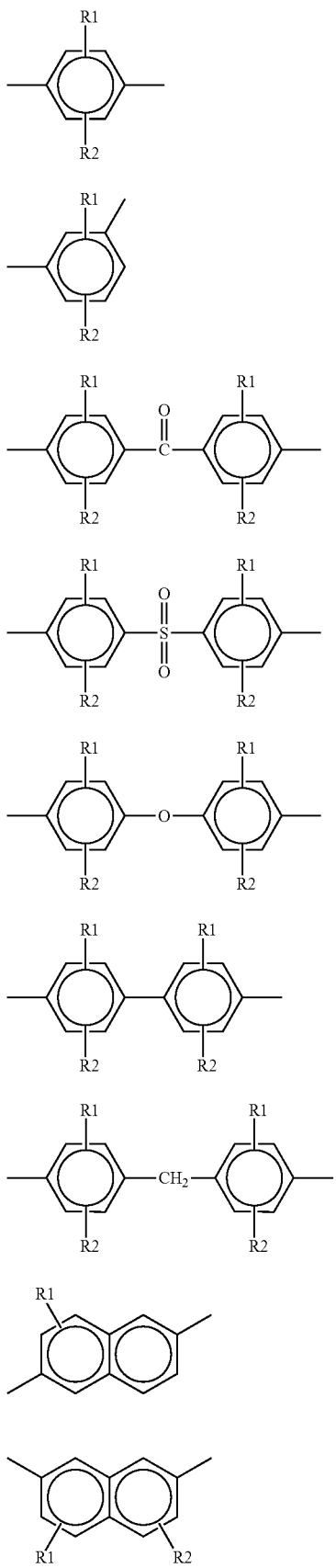

(A)

(B)

(C)

(D)

(E)

(F)

(G)

(H)

(I)

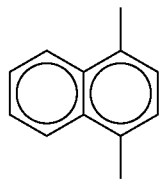

(J)

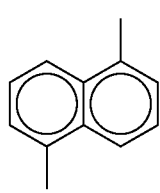

(K)

R1 and R2 in the formulae are substituents selected from hydrogen, alkyl groups whose carbon number is 1 to 6, alkoxy groups whose carbon number is 1 to 6, and halogen groups, and R1 and R2 may be the same or different.

Furthermore, the PAS may be any one of a random copolymer, a block copolymer, and a mixture thereof that contains a repeating unit indicated above.

As representative ones of these copolymers, polyphenylene sulfide, polyphenylene sulfide sulfone, polyphenylene sulfide ketone, random copolymers thereof, block copolymer thereof, mixtures of such copolymers and the like can be cited. As particularly preferable PASs, a polyphenylene sulfide, a polyphenylene sulfide sulfone, and a polyphenylene sulfide ketone which contain, as main constitutional units of the polymer, p-phenylene sulfide units in an amount greater than or equal to 80 mol % and, particularly, greater than or equal to 90 mol % can be cited.

The PAS can be produced by various methods, for example, a method described in Japanese Examined Patent Publication (Kokoku) No. SHO 45-3368 in which a polymer relatively small in molecular weight is obtained, a method described in Japanese Examined Patent Publication (Kokoku) No. SHO 52-12240 and Japanese Unexamined Patent Publication (Kokai) No. SHO 61-7332 in which a polymer relatively large in molecular weight is obtained and the like. The obtained PPS resin can be used after being subjected to various treatments such as cross-linking/molecular weight enhancement by heating in air, heat treatments in an atmosphere of an inert gas such as nitrogen, or in reduced pressure, washing with an organic solvent, hot water, an acid aqueous solution and the like, activation by a functional group-containing compound such as an acid anhydride, an amine, an isocyanate, or a functional group disulfide compound.

The PAS resin particle is not particularly restricted. The polymer obtained by the foregoing technique may be provided as a PAS resin particle. PAS resin particles may also be obtained from pellets, fibers or films formed from a PAS resin. Herein, the PAS resin particle indicates PAS resins which is in a suitable particle diameter range and PAS resins whose particle diameter is beyond the suitable particle diameter range. Furthermore, a grinding treatment described below can be performed according to the configuration of the PAS resin particle that is used. Furthermore, a method in which a raw material is dissolved in a solvent and then spray-drying is performed, a poor solvent precipitation method in which an emulsion is formed in a solvent and then brought into contact with a poor solvent, an in-liquid drying method in which an emulsion is formed in a solvent and then an organic solvent is removed by drying, and a forced melting and kneading method in which a resin component desired to be made into particles and a resin component different from that resin component are mechanically kneaded to form a sea-island structure and then a sea component is removed with a solvent can also be cited.

Grinding Treatment

By performing a grinding treatment using as a raw material a PAS resin particle large in average particle diameter or a PAS resin particle large in uniformity degree (is not uniform), a suitable powder/grain material can be obtained.

Regarding the method of the grinding treatment, there is no particular restriction, and a jet mill, a bead mill, a hammer mill, a ball mill, a sand mill, a turbo mill, and freeze-grinding can be cited. Preferably, the method is dry grinding such as the turbo mill, the jet mill, or the freeze-grinding.

The average particle diameter of the PAS resin particle prior to grinding is not particularly restricted. As for a PAS resin particle produced by a technology used in a common production method, the average particle diameter is approximately greater than or equal to 40 μm and less than or equal to 10 mm. If the particle diameter prior to grinding is large, the time needed for the grinding becomes long. Therefore, it is preferable that a PAS resin particle larger than or equal to 40 μm and smaller than or equal to 2 mm be a raw material.

A PAS resin powder/grain material whose average particle diameter has been made to exceed 1 μm and be less than or equal to 100 μm by performing the grinding treatment according to need is used. A preferred lower limit of the average particle diameter of the PAS resin powder/grain material is 3 μm, more preferably 5 μm, further preferably 8 μm, particularly preferably 10 μm, conspicuously preferably 13 μm, and most preferably 15 μm. Furthermore, a preferred upper limit of the average particle diameter is 75 μm, more preferably 70 μm, further preferably 65 μm, particularly preferably 60 μm, conspicuously preferably 55 μm, and most preferably 50 μm.

As for the PAS resin produced by a common production method, the particle size distribution is wide and the uniformity degree is large and greater than or equal to 5. However, by performing the grinding treatment, the particle size distribution can be made uniform. As for the powder/grain material small in uniformity degree, the compression degree occurring when a powder pressure acts is small so that the uniformity degree of the PAS resin powder/grain material is less than or equal to 4. The uniformity degree of the PAS resin powder/grain material is preferably less than or equal to 3.2, more preferably less than or equal to 3, particularly preferably less than or equal to 2.5, and conspicuously preferably less than or equal to 2. A lower limit of the uniformity degree is theoretically 1 but realistically is preferred to be greater than or equal to 1.1, more preferably greater than or equal to 1.15, further preferably greater than or equal to 1.2, particularly preferably greater than or equal to 1.3, and conspicuously preferably greater than or equal to 1.4. When the uniformity degree of the PAS resin powder/grain material exceeds 4, the compression degree is large even if the average particle diameter is within an appropriate range so that advantageous effects cannot be delivered.

The average particle diameter of the PAS resin particle or the PAS resin powder/grain material is a particle diameter (d50) such that the cumulative frequency from a small-particle diameter side of a particle size distribution measured by a laser diffraction type particle size distribution meter based on the scattering/diffraction theory of Mie becomes 50%.

Furthermore, the uniformity degree of the PAS resin powder/grain material is a value obtained by dividing a particle diameter (d60) such that the cumulative frequency from the small-particle diameter side of the particle size distribution measured by the foregoing method becomes 60% by a particle diameter (d10) such that the cumulative frequency from the small-particle diameter side becomes 10%.

Inorganic Fine Particle Addition

To better the fluidity of the polyarylene sulfide resin powder/grain material, it is important to add an inorganic fine particle. The fluidity of the PAS resin powder/grain material, if the particle diameter thereof is small, deteriorates because of interactions with neighboring particles. However, by adding an inorganic fine particle smaller in particle diameter than the PAS resin powder/grain material, the interparticle distance can be expanded and the fluidity can be bettered.

As the inorganic fine particle to be added to the PAS resin powder/grain material, a particle whose average particle diameter is greater than or equal to 20 nm and less than or equal to 500 nm is used. Herein, the average particle diameter is a value measured by substantially the same method as the average particle diameter of the PAS resin powder/grain material or the PAS resin particle mentioned above.

An upper limit of the average particle diameter of the inorganic fine particle is preferred to be 400 nm, further preferably 300 nm, more preferably 200 nm, particularly preferably 150 nm, and conspicuously preferably 100 nm. A lower limit thereof is preferred to be 20 nm, further preferably 30 nm, more preferably 40 nm, and particularly preferably 50 nm. If the average particle diameter of the inorganic fine particle exceeds 500 nm, the advantageous effect of improving the fluidity of the PAS resin powder/grain composition is not sufficient. Furthermore, if the average particle diameter of the inorganic fine particle falls below 20 nm, the effect of decreasing the compression degree of the PAS resin powder/grain composition cannot be easily obtained while the improving effect on fluidity can be obtained.

As the inorganic fine particle to be added, a particle with the aforementioned average particle diameter can be used. Preferably, there are cited calcium carbonate powders such as light calcium carbonate, heavy calcium carbonate, fine powdered calcium carbonate, and special calcium-based filler; clays (aluminum silicate powders) such as fired clays of nepheline-syenite fine powder, montmorillonite, bentonite and the like, and silane reformed clays; talc; silica (silicon dioxide) powders of molten silica, crystalline silica, amorphous silica and the like; siliceous compounds such as diatomaceous earth and silica sand; ground products of natural minerals such as pumice powder, pumice balloon, slate powder or mica powder; alumina-containing compounds such as alumina (aluminum oxide), alumina colloid (alumina sol), alumina white, and sulfuric acid aluminum; minerals such as barium sulfate, lithopone, calcium sulfate, molybdenum disulfide, and graphite (black lead); glass-based fillers such as glass fibers, glass beads, glass flakes, and foamed glass beads; fly ash spheres; volcanic glass hollow bodies; synthetic inorganic hollow bodies; potassium single crystal titanium; carbon fibers; carbon nanotubes; carbon hollow bodies; carbon 64 fullerenes; anthracite powders; artificial cryolite (cryolite); titanium oxide; magnesium oxide; basic magnesium carbonate; dolomite; potassium titanate; calcium sulfite; mica; asbestos; calcium silicate; aluminum powder; molybdenum sulfide; boron fiber; silicon carbide fiber and the like. Further preferably, there are cited calcium carbonate powders, silica powders, alumina-containing compounds, and glass-based fillers. Particularly preferably, silica powders are cited. Among the silica powders, an amorphous silica powder whose hazardousness to human bodies is small is industrially preferred very much.

The shape of the inorganic fine particle includes a spherical shape, a porous shape, a hollow shape, an indeterminate shape and the like, and is not particularly fixed. Among such, the shape is preferred to be spherical because the spherical shape exhibits good fluidity.

In this case, the spherical shape includes not only a true sphere but also distorted spheres. Incidentally, the shape of the inorganic fine particle is evaluated by the degree of circularity of particles projected two-dimensionally. Herein, the degree of circularity is (the perimeter length of a circle equal in area to a projected particle image)/(the perimeter length of a projected particle). The average degree of circularity of the inorganic fine particles is preferred to be greater than or equal to 0.7 and less than or equal to 1, is more preferred to be greater than or equal to 0.8 and less than or equal to 1, and further preferably is preferred to be greater than or equal to 0.9 and less than or equal to 1.

The silica powders can be roughly divided by their production processes into combustion method silicas (i.e., fumed silicas) obtained by burning silane compounds, deflagration method silicas obtained by explosively burning metal silicon powder, wet silicas obtained through a neutralization reaction between sodium silicate and a mineral acid (among which the silicas synthesized and aggregated in an alkaline condition are termed sedimentation method silicas and the silicas synthesized and aggregated in an acid condition are termed gel method silicas), colloidal silicas (silica sols) obtained by polymerizing an acidic silica obtained from sodium silicate through sodium removal with an ion exchange resin while adjusting the acidic silica to an alkaline state, and sol-gel method silicas obtained through hydrolysis of silane compounds and the like. To attain advantageous effects, the sol-gel method silicas are preferred.

That is, among the inorganic fine particles, the silicas are preferred and the sol-gel method silicas and the spherical silicas are further preferred. Among these, the sol-gel method spherical silicas are the most preferred.

Further preferably, a sol-gel method spherical silica whose surface has been subjected to a hydrophobizing treatment with a silane compound, a silazane compound and the like is used. Because of the hydrophobizing treatment of the surface, aggregation of inorganic fine particles is inhibited and dispersibility of the inorganic fine particles in the PAS resin powder/grain material improves. As for the silane compound, there are cited, for example, unsubstituted or halogen-substituted trialkoxysilanes such as methyl trimethoxysilane, methyl triethoxysilane, ethyl trimethoxysilane, ethyl triethoxysilane, n-propyl trimethoxysilane, n-propyl triethoxysilane, isopropyl trimethoxysilane, isopropyl triethoxysilane, butyl trimethoxysilane, butyl triethoxysilane, hexyl trimethoxysilane, trifluoropropyl trimethoxysilane, and heptadecafluorodecyl trimethoxysilane, and preferably methyl trimethoxysilane, methyl triethoxysilane, ethyl trimethoxysilane, and ethyl triethoxysilane, and more preferably methyl trimethoxysilane and methyl triethoxysilane or partial hydrolytic condensation products thereof. Furthermore, as the silazane compounds, there are cited, for example, hexamethyl disilazane, hexaethyl disilazane and the like, and preferably hexamethyl disilazane. As monofunctional silane compounds, there are cited, for example, monosilanol compounds such as trimethyl silanol and triethyl silanol; monochlorosilanes such as trimethyl chlorosilane and triethyl chlorosilane; monoalkoxysilanes such as trimethyl methoxysilane and trimethyl ethoxysilane; monoaminosilanes such as trimethylsilyl dimethyl amine and trimethylsilyl diethyl amine; and monoacyloxysilanes such as trimethyl acetoxysilane. Preferably, there are cited trimethyl silanol, trimethyl methoxysilane, or trimethylsilyl diethyl amine and particularly preferably trimethyl silanol or trimethyl methoxysilane.

These inorganic fine particles can be used alone or in combination of two or more species.

The amount of the inorganic fine particle blended is greater than or equal to 0.1 weight part and less than or equal to 5 weight parts relative to 100 weight parts of the PAS resin powder/grain material. An upper limit of the charge thereof blended is preferably 4 weight parts, more preferably 3 weight parts, further preferably 2 weight parts, and particularly preferably 1 weight part.

Furthermore, a lower limit of the amount thereof blended is preferred to be 0.2 weight part, more preferred to be 0.3 weight part, and further preferred to be 0.4 weight part.

Production Method for PAS Resin Powder/Grain Composition

The inorganic fine particle is blended in the foregoing PAS resin powder/grain material. The method of achieving a uniform resin powder/grain composition is not particularly fixed. The resin powder/grain material and the inorganic fine particle are mixed by a known method. A method in which at the time of performing the foregoing grinding treatment, the inorganic fine particle is blended so that the grinding and the mixing are simultaneously performed can also be adopted.

As the method of mixture, mixing methods by shaking, mixing methods involving grinding by a ball mill, a coffee mill and the like, mixing methods by a stirring blade such as a Nauta mixer, a Henschel mixer and the like, mixing methods in which a container of a V-shape mixer or the like is rotated, methods in which liquid-phase mixing in a solvent is performed followed by desiccation, mixing methods in which stirring is performed by an air stream through the use of a flash blender or the like, mixing methods in which a powder/grain material and/or a slurry is atomized by using an atomizer or the like can be adopted.

PAS Resin Powder/Grain Composition

The PAS resin powder/grain composition in which the inorganic fine particle has been blended in the PAS resin powder/grain material is excellent in powder fluidity and has a feature that the compression degree is low. Concretely, a PAS resin powder/grain composition whose angle of repose is less than or equal to 40 degrees according to a preferred mode, less than or equal to 38 degrees according to a more preferred mode, and less than or equal to 35 degrees according to a further preferred mode and/or whose compression degree is less than or equal to 7.5 according to a preferred mode, less than or equal to 6.5 according to a more preferred mode, and less than or equal to 5.5 according to a further preferred mode can be obtained.

The angle of repose and the compression degree are values measured on the basis of a measurement method for Carr's fluidity index ("Terminology Dictionary of Powder Technology", 2nd edition, edited by the Society of Powder Technology, Japan, published by Nikkan Kogyo Shimbun, Ltd., Mar. 30, 2000, pp. 56-57).

The powder/grain material as mentioned above is excellent in fluidity and does not easily undergo a compaction due to powder pressure so that trouble such as the clogging at the time of supply to or discharge from a silo or the like or a blockade in air transportation, is less prone to occur.

EXAMPLES

Hereinafter, our methods and compositions will be concretely described with reference to examples and comparative examples. However, this disclosure is not limited only to the examples. Incidentally, various measurement methods are as follows.

Average Particle Diameter

The average particle diameter of the PAS resin powder/grain material was measured by using a laser diffraction/scattering method particle size distribution measurement apparatus MT3300 EXII made by NIKKISO and using as a dispersion medium a 0.5 mass % aqueous solution of polyoxyethylene cumyl phenyl ether (commercial product name: Nonal 912A, made by Toho Chemical Industry, hereinafter referred to as Nonal 912A). Concretely, the total volume of the fine particle obtained by analyzing the scattered light of laser by the Microtrac method was determined as 100% and a cumulative curve was determined. The particle diameter at a point at which the cumulative curve from the small-particle diameter side was 50% (median diameter: d50) was determined as an average particle diameter of the PAS resin powder/grain material.

For measurement of the average particle diameter of the fumed silica, arbitrary 100 particles were randomly selected from an image magnified 100 thousand times by using an electron microscope, and maximum lengths thereof were measured as particle diameters, and a number average value thereof was determined as an average particle diameter. Measurement of the average particle diameter of silicas other than the fumed silica was performed by substantially the same method as that of the PAS resin powder/grain material.

Uniformity Degree

As for the uniformity degree of the PAS resin powder/grain material, the value of d60/d10 in terms of the particle diameter distribution measured by using a laser diffraction/scattering method particle size distribution measurement apparatus MT3300 EXII made by NIKKISO was determined as the uniformity degree of the PAS resin powder/grain material. The wider the particle size distribution, the greater the uniformity degree becomes.

Angle of Repose

The angle of repose of the PAS resin powder/grain material or the PAS resin powder/grain composition was measured by using a Powder Tester PT-N Model made by HOSOKAWA MICRON.

Compression Degree

The compression degree of the PAS resin powder/grain material or the PAS resin powder/grain composition was calculated from a loose bulk density and a compacted bulk density measured through the use of a Powder Tester PT-N Model made by HOSOKAWA MICRON, using the following expression.

The compression degree=(the compacted bulk density−the loose bulk density)/the compacted bulk density×100

Production Example 1

A 1-liter autoclave equipped with an agitator was charged with 1.00 mol of 47% sodium hydrosulfide, 1.05 mol of 46% sodium hydroxide, 1.65 mol of N-methyl-2-pyrrolidone (NMP), 0.45 mol of sodium acetate, and 5.55 mol of ion exchanged water. Heating was gradually performed over a time of about 2 hours to 225° C. while nitrogen is passed through at normal pressure. After 11.70 mol of water and 0.02 mol of NMP were distilled out, the reaction vessel was cooled to 160° C. Furthermore, the amount of hydrogen sulfide flown was 0.01 mol.

Next, 1.02 mol of p-dichlorobenzene (p-DCB) and 1.32 mol of NMP were added and the reaction vessel was tightly closed in a nitrogen gas. After that, while stirring was being performed at 400 rpm, the temperature was raised in two steps, that is, from 200° C. to 240° C. over a time of 90 minutes and from 240° C. to 270° C. over a time of 30 minutes. After 10 minutes elapsed following the arrival at 270° C., 0.75 mol of water was injected into the system over a time of 15 minutes. After 120 minutes elapsed at 270° C., cooling was performed at a rate of 1.0° C./min to 200° C. After that, rapid cooling was performed down to the vicinity of room temperature and the content was taken out.

After the content was taken out and diluted with 0.5 liter of NMP, the solvent and the solid were separated with a sieve (80 mesh). The obtained particle was washed and separated with 1 liter of warm water several times to obtain a cake.

The obtained cake was dried at 120° C. under a nitrogen gas stream to obtain PAS-1. The average particle diameter of the obtained PAS-1 was 1600 μm and the uniformity degree thereof was 4.1.

Production Example 2

A 1-liter autoclave equipped with an agitator was charged with 1.00 mol of 47% sodium hydrosulfide, 1.04 mol of 48% sodium hydroxide, 2.12 mol of N-methyl-2-pyrrolidone (NMP), and 5.55 mol of ion exchanged water. Heating was gradually performed over a time of about 2 hours to 225° C. while nitrogen is passed through at normal pressure. After 11.70 mol of water and 0.02 mol of NMP were distilled out, the reaction vessel was cooled to 160° C. Furthermore, the amount of hydrogen sulfide flown was 0.01 mol.

Next, 1.03 mol of p-dichlorobenzene (p-DCB) and 0.76 mol of NMP were added and the reaction vessel was tightly closed in a nitrogen gas. After that, while stirring was being performed at 400 rpm, the temperature was raised from 200° C. to 270° C. over a time of 125 minutes and kept at 276° C. for 65 minutes. Then, rapid cooling was performed down to the vicinity of room temperature and the content was taken out.

The obtained solid and 750 milliliters of ion exchanged water were placed in an autoclave equipped with an agitator. After washing at 70° C. for 30 minutes, suction filtration was performed with a glass filter. Subsequently, 4 liters of ion exchanged water heated to 70° C. was poured to the glass filter and suction filtration was performed to obtain a cake.

The obtained cake, 600 liters of ion exchanged water, and 0.17% of calcium acetate monohydrate relative to polyarylene sulfide were added and charged into an autoclave equipped with an agitator. After the interior of the autoclave was substituted with nitrogen, the temperature was raised to 190° C. and held thereat for 30 minutes. After that, the autoclave was cooled and the content was taken out.

After the content was subjected to suction filtration with a glass filter, 500 milliliters of ion exchanged water at 70° C. was poured thereto and suction filtration was performed to obtain a cake.

The obtained cake was dried at 120° C. under a nitrogen gas stream to obtain PAS-2. The average particle diameter of the obtained PAS-2 was 40 μm and the uniformity degree thereof was 5.0.

Example 1

The PAS-1 was ground for 120 minutes by a jet mill (100 AFG made by HOSOKAWA MICRON) to obtain a powder/grain material having an average particle diameter of 40 μm and a uniformity degree of 1.6. 0.5 g of a sol-gel method spherical silica (X-24-9404 made by Shin-Etsu Chemical Co., Ltd.) subjected to a surface treatment with hexamethyl disilazane and having an average particle diameter of 50 nm was added to 100 g of that powder/grain material. Mixing was carried out by shaking. The angle of repose of the obtained powder/grain composition was 36 degrees and the compression ratio thereof was 5.4%.

Example 2

A PAS resin powder/grain material was obtained in substantially the same manner as in Example 1, except that the weight of the inorganic fine particle added was 3.0 g. The angle of repose of the obtained powder/grain composition was 31 degrees and the compression ratio thereof was 5.3%.

Example 3

A PAS resin powder/grain material was obtained in substantially the same manner as in Example 1, except that the inorganic fine particle added was a sol-gel method spherical silica (X-24-9163A made by Shin-Etsu Chemical Co., Ltd.) subjected to a surface treatment with hexamethyl disilazane and having an average particle diameter of 110 nm. The angle of repose of the obtained powder/grain composition was 35 degrees and the compression ratio thereof was 5.5%.

Comparative Example 1

A PAS resin powder/grain material was obtained in substantially the same manner as in Example 1, except that the inorganic fine particle was not added. The angle of repose of the obtained powder/grain composition was 41 degrees and the compression ratio thereof was 19.3%.

Comparative Example 2

A PAS resin powder/grain material was obtained in substantially the same manner as in Example 1, except that the inorganic fine particle added was a fumed silica (AEROSIL 380 made by EVONIK) having an average particle diameter of 7 nm. The angle of repose of the obtained powder/grain composition was 34 degrees and the compression ratio thereof was 7.6%.

Example 4

The PAS-2 was grounded for 60 minutes by a jet mill (100 AFG made by HOSOKAWA MICRON) to obtain a powder/grain material having an average particle diameter of 15 μm and a uniformity degree of 3.2. 0.5 g of a sol-gel method spherical silica (X-24-9404 made by Shin-Etsu Chemical Co., Ltd.) subjected to a surface treatment with hexamethyl disilazane and having an average particle diameter of 50 nm was added to 100 g of that powder/grain material. Mixing was carried out by shaking. The angle of repose of the obtained powder/grain composition was 39 degrees and the compression ratio thereof was 7.2%.

Example 5

A PAS resin powder/grain material was obtained in substantially the same manner as in Example 4, except that the inorganic fine particle added was a sol-gel method spherical silica (X-24-9163A made by Shin-Etsu Chemical Co., Ltd.) subjected to a surface treatment with hexamethyl disilazane and having an average particle diameter of 110 nm. The angle of repose of the obtained powder/grain composition was 39 degrees and the compression ratio thereof was 7.2%.

Comparative Example 3

A PAS resin powder/grain material was obtained in substantially the same manner as in Example 4, except that the inorganic fine particle added was a fumed silica (AEROSIL 380 made by NIPPON AEROSIL) having an average particle diameter of 7 nm. The angle of repose of the obtained powder/grain composition was 37 degrees and the compression ratio thereof was 9.3%.

Comparative Example 4

A PAS resin powder/grain material was obtained in substantially the same manner as in Example 4, except that the grinding of the PAS-2 was not performed. The angle of repose of the obtained powder/grain composition was 47 degrees and the compression ratio thereof was 16.1%.

Comparative Example 5

A PAS resin powder/grain material was obtained in substantially the same manner as in Comparative example 4, except that the inorganic fine particle was not added. The angle of repose of the obtained powder/grain composition was 48 degrees and the compression ratio thereof was 19.7%.

TABLE 1

| | PAS resin powder/grain material | | Inorganic fine particle | | | Properties of powder/grain composition | |
| --- | --- | --- | --- | --- | --- | --- | --- |
| | Average particle diameter (μm) | Uniformity degree | Kind | Amount added (weight %) | Average particle diameter (nm) | Angle of repose (degree) | Compression degree (%) |
| Example 1 | 40 | 1.6 | Spherical silica | 0.5 | 50 | 36 | 5.4 |
| Example 2 | 40 | 1.6 | Spherical silica | 3.0 | 50 | 31 | 5.3 |
| Example 3 | 40 | 1.6 | Spherical silica | 0.5 | 110 | 35 | 5.5 |

TABLE 1-continued

| | PAS resin powder/grain material | | Inorganic fine particle | | | Properties of powder/grain composition | |
|---|---|---|---|---|---|---|---|
| | Average particle diameter (μm) | Uniformity degree | Kind | Amount added (weight %) | Average particle diameter (nm) | Angle of repose (degree) | Compression degree (%) |
| Example 4 | 15 | 3.2 | Spherical silica | 0.5 | 50 | 39 | 7.2 |
| Example 5 | 15 | 3.2 | Spherical silica | 0.5 | 110 | 39 | 7.2 |
| Comparative example 1 | 40 | 1.6 | — | — | — | 41 | 19.3 |
| Comparative example 2 | 40 | 1.6 | Fumed silica | 0.5 | 7 | 34 | 7.6 |
| Comparative example 3 | 15 | 3.2 | Fumed silica | 0.5 | 7 | 37 | 9.3 |
| Comparative example 4 | 40 | 5.0 | Spherical silica | 0.5 | 50 | 47 | 16.1 |
| Comparative example 5 | 40 | 5.0 | — | — | — | 48 | 19.7 |

INDUSTRIAL APPLICABILITY

The polyarylene sulfide resin powder/grain material, because of having good powder fluidity, is excellent in handling characteristics and can be suitably used as a forming material for injection forming, extrusion forming and the like. Furthermore, the polyarylene sulfide resin powder/grain material, because of being very small in particle diameter and having good powder fluidity, provides good surface smoothness when used as a powder paint host particle, and provides good impregnation characteristics when used as a matrix resin of a carbon fiber-reinforced resin. Thus, the polyarylene sulfide resin powder/grain material can be particularly suitably used.

The invention claimed is:

1. A polyarylene sulfide resin powder/grain composition in which 100 weight parts of polyarylene sulfide resin powder/grain material whose average particle diameter exceeds 1 μm and is less than or equal to 100 μm and whose uniformity degree is less than or equal to 4 has been blended with 0.1 to 5 weight parts of an inorganic fine particle having an average particle diameter greater than or equal to 20 nm and less than or equal to 500 nm, wherein the polyarylene sulfide resin powder/grain composition has an angle of repose less than or equal to 40 degrees and a compression degree of less than or equal to 7.5.

2. The polyarylene sulfide resin powder/grain composition according to claim 1, wherein the inorganic fine particle is a spherical silica fine particle.

3. The polyarylene sulfide resin powder/grain composition according to claim 1, wherein the average particle diameter of the polyarylene sulfide resin powder/grain material is greater than or equal to 10 μm and less than or equal to 50 μm.

4. A method of producing the polyarylene sulfide resin powder/grain composition according to claim 1, comprising:
   grinding polyarylene sulfide resin to obtain a polyarylene sulfide resin particle powder/grain material whose average particle diameter is greater than or equal to 40 μm and less than or equal to 2 mm and whose average particle diameter exceeds 1 μm and is less than or equal to 100 μm and whose uniformity degree is less than or equal to 4, and
   blending inorganic fine particles in polyarylene sulfide resin powder/grain material.

5. The method according to claim 4, wherein the grinding is dry grinding.

6. The polyarylene sulfide resin powder/grain composition according to claim 2, wherein the average particle diameter of the polyarylene sulfide resin powder/grain material is greater than or equal to 10 μm and less than or equal to 50 μm.

7. A method of producing the polyarylene sulfide resin powder/grain composition according to claim 2, comprising:
   grinding polyarylene sulfide resin to obtain a polyarylene sulfide resin particle powder/grain material whose average particle diameter is greater than or equal to 40 μm and less than or equal to 2 mm and whose average particle diameter exceeds 1 μm and is less than or equal to 100 μm and whose uniformity degree is less than or equal to 4, and
   blending inorganic fine particles in polyarylene sulfide resin powder/grain material.

8. A method of producing the polyarylene sulfide resin powder/grain composition according to claim 3, comprising:
   grinding polyarylene sulfide resin to obtain a polyarylene sulfide resin particle powder/grain material whose average particle diameter is greater than or equal to 40 μm and less than or equal to 2 mm and whose average particle diameter exceeds 1 μm and is less than or equal to 100 μm and whose uniformity degree is less than or equal to 4, and
   blending inorganic fine particles in polyarylene sulfide resin powder/grain material.

* * * * *